United States Patent
Aiki et al.

(10) Patent No.: US 11,198,426 B2
(45) Date of Patent: Dec. 14, 2021

(54) HYBRID VEHICLE

(71) Applicant: TOYOTA JIDOSHA KABUSHIKI KAISHA, Toyota (JP)

(72) Inventors: Kosuke Aiki, Nagatute (JP); Kisaburo Hayakawa, Nagatute (JP); Yoshiaki Ito, Nagatute (JP); Hiroyuki Yamaguchi, Nagatute (JP); Hideto Inagaki, Nagatute (JP); Masaki Okamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 419 days.

(21) Appl. No.: 16/250,061

(22) Filed: Jan. 17, 2019

(65) Prior Publication Data
US 2019/0217853 A1   Jul. 18, 2019

(30) Foreign Application Priority Data
Jan. 18, 2018   (JP) .............................. JP2018-006414

(51) Int. Cl.
*B60W 20/40*   (2016.01)
*B60K 6/36*   (2007.10)
(Continued)

(52) U.S. Cl.
CPC .............. *B60W 20/40* (2013.01); *B60K 6/36* (2013.01); *B60K 6/387* (2013.01); *B60K 6/46* (2013.01);
(Continued)

(58) Field of Classification Search
CPC ...... B60W 20/40; B60W 20/20; B60W 10/26; B60W 10/06; B60W 10/08; B60W 10/02;
(Continued)

(56) References Cited

U.S. PATENT DOCUMENTS

| | | | |
|---|---|---|---|
| 6,776,739 B2* | 8/2004 | Eguchi | B60W 10/30 477/107 |
| 2003/0073540 A1* | 4/2003 | Eguchi | B60W 20/40 477/110 |

(Continued)

FOREIGN PATENT DOCUMENTS

| | | |
|---|---|---|
| JP | 2005127505 A | 5/2005 |
| JP | 2010-143310 A | 7/2010 |

(Continued)

*Primary Examiner* — Frederick M Brushaber
(74) *Attorney, Agent, or Firm* — Sughrue Mion, PLLC

(57) ABSTRACT

A hybrid vehicle includes a first gear mechanism which transmits the power of the internal combustion engine to the motor generator side, while accelerating the power between the internal combustion engine and the motor generator; a second gear mechanism which transmits the power of the motor generator side to a vehicle drive shaft, while decelerating the power between the motor generator and the vehicle drive shaft; a third gear mechanism which transmits the power of the drive motor side to the vehicle drive shaft, while decelerating the power between the drive motor and the vehicle drive shaft; a clutch mechanism which switches connection and disconnection between the drive shaft of the motor generator and the first gear mechanism or the second gear mechanism; and a control device which controls the clutch mechanism. The motor generator is not connected to both the vehicle drive shaft and the internal combustion engine at the same time at the time of normal traveling.

5 Claims, 5 Drawing Sheets

(51) Int. Cl.
*B60K 6/46* (2007.10)
*B60K 6/387* (2007.10)
*B60W 20/20* (2016.01)
*B60W 10/26* (2006.01)
*B60W 10/06* (2006.01)
*B60W 10/08* (2006.01)
*B60W 10/02* (2006.01)
*B60W 20/10* (2016.01)

(52) U.S. Cl.
CPC ..... *B60Y 2200/92* (2013.01); *B60Y 2400/421* (2013.01)

(58) Field of Classification Search
CPC ......... B60W 20/10; B60W 20/00; B60W 6/36; B60K 6/46; B60K 6/387; B60K 6/442; B60K 6/365; B60Y 2200/92; B60Y 2400/421; Y02T 10/62
See application file for complete search history.

(56) References Cited

U.S. PATENT DOCUMENTS

| | | | |
|---|---|---|---|
| 2005/0070401 A1 | 3/2005 | Shimizu | |
| 2009/0227409 A1* | 9/2009 | Ito | B60W 10/115 475/5 |
| 2015/0051767 A1* | 2/2015 | Mohri | B60L 50/16 701/22 |
| 2015/0280565 A1* | 10/2015 | Okamura | B60L 50/40 307/10.1 |

FOREIGN PATENT DOCUMENTS

| | | |
|---|---|---|
| JP | 2017032033 A | 2/2017 |
| JP | 2017035962 A | 2/2017 |

\* cited by examiner

HYBRID VEHICLE

CROSS REFERENCE TO RELATED APPLICATION

This application claims priority to Japanese Patent Application No. 2018-006414 filed on Jan. 18, 2018, which is incorporated herein by reference in its entirety including the specification, claims, drawings, and abstract.

TECHNICAL FIELD

The present disclosure relates to a hybrid vehicle.

BACKGROUND

JP 2010-143310 A describes a power generation control device of a hybrid vehicle that travels by driving a drive motor using at least one of generated electric power of a generator driven by an internal combustion engine and discharged electric power of a battery. The power generation control device sets a target SOC of the battery, calculates a generated electric power target value on the basis of the target SOC, and controls the internal combustion engine and the generator on the basis of the generated electric power target value. Further, the power generation control device sets the target SOC of the battery at the time of low-speed traveling of the vehicle to be lower than the target SOC at the time of high-speed traveling. As a result, the drive motor is efficiently operated at a low voltage at the time of low-speed traveling in which the rotational speed of the motor decreases, and the drive motor is efficiently operated at a high voltage at the time of high-speed traveling in which the rotational speed of the motor increases.

In the hybrid vehicle described in JP 2010-143310 A, continuous high vehicle speed traveling can be performed, and there is a possibility that the efficiency at the time of traveling can be improved. However, in the vehicle, since the drive motor is driven with high output at the time of high-speed traveling, the drive motor needs to be enlarged accordingly. Further, since the inverter that controls the high-output drive motor needs to have a structure that can withstand the high output, it becomes a factor of increasing cost.

An object of the disclosure is to make it possible to drive a vehicle with high output in a hybrid vehicle, to improve efficiency at the time of traveling, to miniaturize a drive motor, and to reduce the cost of the vehicle.

SUMMARY

A hybrid vehicle according to the disclosure is a hybrid vehicle which travels by driving a drive motor with at least one of generated electric power of a motor generator driven by an internal combustion engine and discharged electric power of a battery, the hybrid vehicle including: a first gear mechanism which transmits the power of the internal combustion engine to the motor generator side, while accelerating the power between an output shaft of the internal combustion engine and a drive shaft of the motor generator; a second gear mechanism which transmits the power of the motor generator side to a vehicle drive shaft, while decelerating the power between the drive shaft of the motor generator and the vehicle drive shaft; a third gear mechanism which transmits the power of the drive motor side to the vehicle drive shaft, while decelerating the power between the drive motor and the vehicle drive shaft; a clutch mechanism which switches connection and disconnection between the drive shaft of the motor generator and the first gear mechanism or the second gear mechanism; and a control device which controls the clutch mechanism, in which the drive shaft of the motor generator is configured to not be connected to both the vehicle drive shaft and the output shaft of the internal combustion engine at the same time at the time of normal traveling.

According to the hybrid vehicle of the disclosure, when the vehicle is driven with a low output such as low-speed traveling, by connecting the drive shaft of the motor generator to the first gear mechanism, the motor generator is caused to generate electricity using the internal combustion engine, and the generated electric power can be supplied to the drive motor or the battery. As a result, it is possible to drive only the drive motor, among the drive motor and the motor generator, as a drive source of the vehicle, and to perform efficient vehicle traveling by setting the efficiency of the drive motor to be higher than the efficiency of the motor generator. Furthermore, when the vehicle is driven with a high output such as high-speed traveling, by connecting the drive shaft of the motor generator to the second gear mechanism, the driving forces of both the drive motor and the motor generator can be used as the driving force of the vehicle. As a result, it is possible to drive the vehicle at a high output, and it is possible to improve the efficiency at the time of traveling, and to miniaturize the drive motor and to reduce the cost of the vehicle.

BRIEF DESCRIPTION OF DRAWINGS

Embodiments of the present disclosure will be described based on the following figures, wherein.

DESCRIPTION OF EMBODIMENTS

Figure 1:
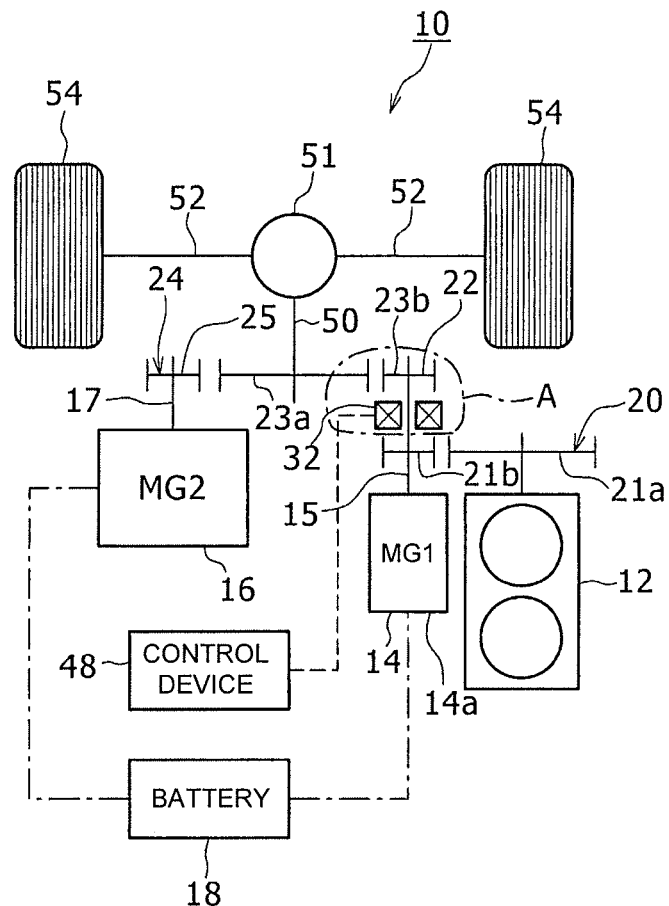
FIG. 1 is a configuration diagram of a hybrid vehicle according to an embodiment of the disclosure.

Hereinafter, an embodiment of the disclosure will be described with reference to the drawings. Hereinafter, in a case in which a plurality of embodiments, modified examples and the like are included, they can be implemented by appropriate combination. Hereinafter, shapes, numerical values, and numbers are examples for explanation and can be appropriately changed depending on the specification of the hybrid vehicle. Hereinafter, description will be given by denoting the same elements with the same reference numerals in all the drawings.

FIG. 1 is a configuration diagram of a hybrid vehicle 10 according to the embodiment. The hybrid vehicle 10 includes an internal combustion engine 12, a first motor generator (MG 1) 14, a second motor generator (MG 2) 16, a battery 18, a first gear mechanism 20, a second gear mechanism 22, a third gear mechanism 24, a clutch mechanism 32, and a control device 48. The second motor generator 16 corresponds to a drive motor. Hereinafter, the first motor generator 14 will be referred to as a first MG 14 and the second motor generator 16 will be referred to as a second MG 16.

The hybrid vehicle 10 is a series hybrid type vehicle and travels, while switching between HV traveling and EV traveling. When the hybrid vehicle 10 is traveling in the HV mode, the first MG 14 is driven by the internal combustion engine 12 to generate electricity. The second MG 16 is driven by at least one of generated electric power of the first MG 14 and discharged electric power of the battery 18, and the power from the second MG 16 is transmitted to a vehicle drive shaft 50. Right and left wheels 54 are connected to the vehicle drive shaft 50 via a differential gear mechanism 51 and an axle 52. As a result, when the vehicle drive shaft 50 is driven, the hybrid vehicle 10 travels. At this time, the hybrid vehicle 10 travels, using the second MG 16 as a drive source.

On the other hand, when the hybrid vehicle 10 is traveling in the EV mode, the discharged electric power of the battery 18 is supplied to both the first MG 14 and the second MG 16. As a result, the first MG 14 and the second MG 16 are driven, and the power of both the first MG 14 and the second MG 16 is transmitted to the vehicle drive shaft 50. Therefore, the wheels 54 are driven and the hybrid vehicle 10 travels. At this time, the hybrid vehicle 10 travels, using both the first MG 14 and the second MG 16 as drive sources.

Hereinafter, the configuration of the hybrid vehicle 10 will be specifically described. The first MG 14 has a function as a generator driven by the internal combustion engine 12 and a function as an electric motor driven by electric power supplied from the battery 18. For example, at the time of startup of the internal combustion engine 12, the first MG 14 is driven by the discharged electric power of the battery 18, and the power is transmitted to the internal combustion engine 12, thereby making it possible to start up the internal combustion engine 12. A drive shaft 15 of the first MG 14 protrudes from one end (an upper end in FIG. 1) in an axial direction of a motor case 14a.

The second MG 16 has a function as an electric motor that is driven by electric power supplied from the battery 18, and a function as a power generator for power regeneration that generates electricity using power transmitted from the wheel 54 side via the vehicle drive shaft 50 when braking the vehicle.

The first MG 14 is connected to the battery 18 via a first inverter (not illustrated). The first inverter has a plurality of switching elements, and switching of the switching elements is controlled by a control signal from the control device 48 to be described later. As a result, torque of the first MG 14 is controlled.

The second MG 16 is connected to the battery 18 via a second inverter (not illustrated). The second inverter has a plurality of switching elements, and the switching of the switching elements is controlled by a control signal from the control device 48. As a result, the torque of the second MG 16 is controlled.

The first gear mechanism 20 includes a large gear 21a fixed to an output shaft of the internal combustion engine 12 and a small gear 21b, and is configured by meshing of the large gear 21a and the small gear 21b. The small gear 21b is fixed to a cylindrical first intermediate shaft 21c (FIG. 2) through which a movable shaft 34a (FIG. 2) to be described later is inserted. The movable shaft 34a is rotated in synchronization with the drive shaft 15 of the first MG 14 as will be described later. The first intermediate shaft 21c can be connected to the drive shaft 15 of the first MG 14 via the clutch mechanism 32 to be described later. As a result, the first gear mechanism 20 transmits the power of the internal combustion engine 12 to the first intermediate shaft 21c on the first MG 14 side, while increasing the power between the output shaft of the internal combustion engine 12 and the drive shaft 15 of the first MG 14.

Figure 2:
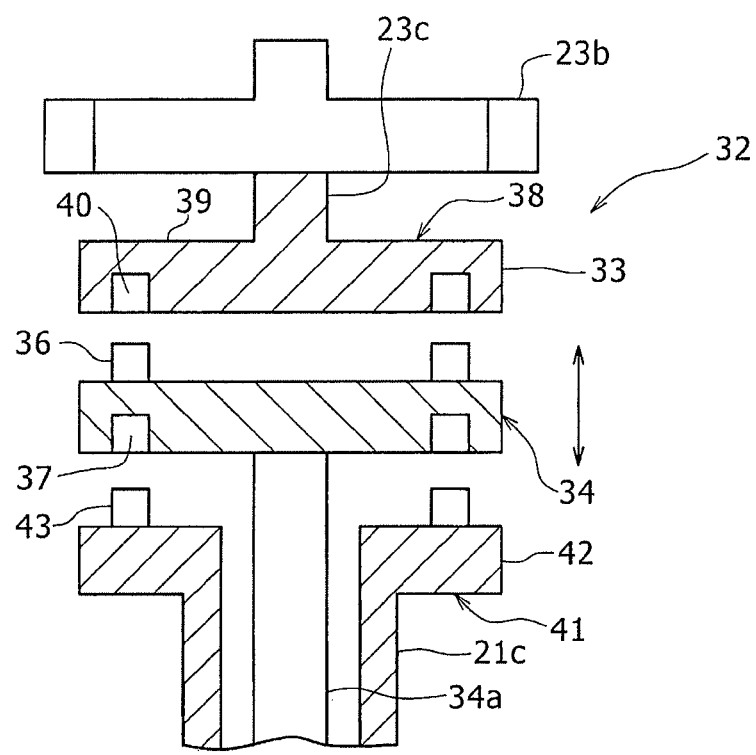
FIG. 2 is a cross-sectional view illustrating a dog clutch constituting a clutch mechanism in a part A of FIG. 1.

The second gear mechanism 22 includes a large gear 23a fixed to an end portion of the vehicle drive shaft 50 on the side opposite to the differential gear mechanism 51, and a small gear 23b, and is configured by meshing of the large gear 23a and the small gear 23b. The small gear 23b is fixed to a second intermediate shaft 23c (FIG. 2). The second intermediate shaft 23c can be connected to the drive shaft 15 of the first MG 14 via the clutch mechanism 32. As a result, the second gear mechanism 22 transmits the power of the second intermediate shaft 23c on the first MG side to the vehicle drive shaft 50, while decelerating the power between the drive shaft of the first MG and the vehicle drive shaft. The large gear 23a constituting the second gear mechanism 22 also constitutes the third gear mechanism 24 to be described later.

Figure 3:
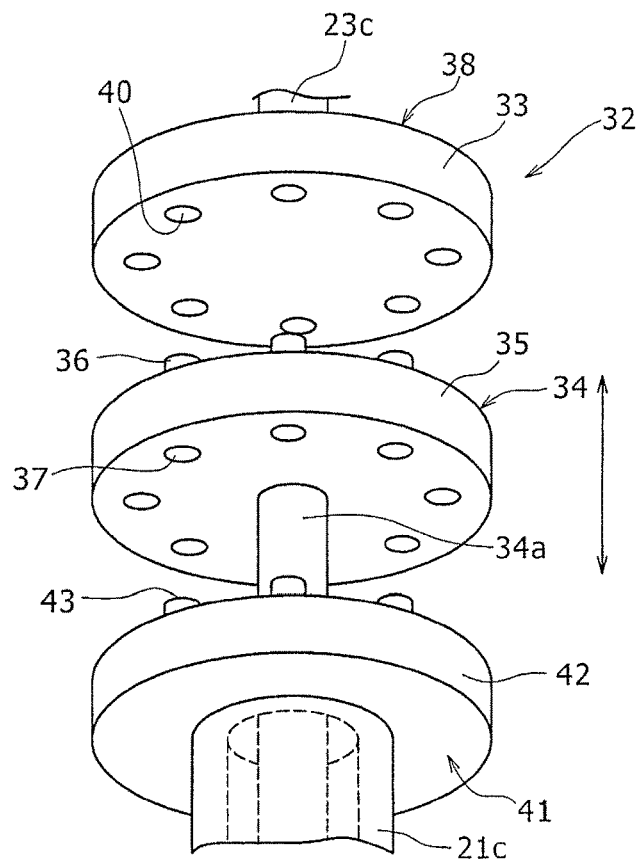
FIG. 3 is a perspective view of the dog clutch of FIG. 2.

The third gear mechanism 24 includes the above-described large gear 23a fixed to the vehicle drive shaft 50, and a small gear 25 fixed to a drive shaft 17 of the second MG 16, and is configured by meshing of the large gear 23a and the small gear 25. Further, two large gears may be fixed to the vehicle drive shaft 50, one large gear of the two large gears may be meshed with the small gear 23b of the second gear mechanism 22, and the other large gear may be meshed with the small gear 25 of the third gear mechanism 24. FIG. 2 is a cross-sectional view illustrating a dog clutch 33 constituting the clutch mechanism 32 in a part A of FIG. 1. FIG. 3 is a perspective view of the dog clutch 33 of FIG. 2.

The dog clutch 33 is configured to include an intermediate clutch element 34, a first clutch element 38, and a second clutch element 41. The intermediate clutch element 34 has the movable shaft 34a that is rotated in synchronization with the drive shaft 15 of the first MG 14 and is movable in an axial direction with respect to the drive shaft 15, and a disc portion 35 fixed to one end of the movable shaft 34a. At a plurality of positions in a circumferential direction on one side (an upper surface in FIG. 2) of the disc portion 35, teeth portions 36 are formed to protrude. Hole portions 37 are formed at a plurality of positions in the circumferential direction on the other surface (a lower surface in FIG. 2) of the disc portion 35.

Each of the teeth portions 36 has, for example, a columnar shape, and each hole portion 37 is, for example, a circular hole. The plurality of teeth portions 36 and the plurality of hole portions 37 are disposed at equal intervals in the circumferential direction of the disc portion 35. The intermediate clutch element 34 is supported so as to be rotatable and movable in the axial direction (a vertical direction in FIG. 2) in a clutch case (not illustrated) in which the dog clutch 33 is supported.

The first clutch element 38 and the second clutch element 41 are disposed on both sides with the intermediate clutch element 34 interposed therebetween. Specifically, the first clutch element 38 is disposed on one side (the upper side in FIG. 2) of the intermediate clutch element 34 with a gap. The second clutch element 41 is disposed on the other side (the lower side in FIG. 2) of the intermediate clutch element 34 with a gap. The first clutch element 38 has a disc portion 39. The first clutch element 38 is coupled in parallel to the small gear 23b constituting the second gear mechanism 22 (FIG. 1) via the above-described second intermediate shaft 23c coupled to the central axis. The center axes of the first clutch element 38 and the small gear 23b coincide with each other. In the disc portion 39 of the first clutch element 38, a hole portion 40 is formed at a plurality of positions in the circumferential direction of the surface facing the intermediate clutch element 34. The hole portion 40 has such a shape that the teeth portions 36 of the intermediate clutch element 34 can be fitted thereto. For example, when the teeth portions 36 have a columnar shape, the hole portions 40 are circular holes substantially matching the teeth portions 36. The plurality of hole portions 40 are disposed at equal intervals in the circumferential direction of the disc portion 39 of the first clutch element 38.

The second clutch element 41 has a disc portion 42. The second clutch element 41 is coupled in parallel to the small gear 21b (FIG. 1) constituting the first gear mechanism 20 (FIG. 1) via the above-described cylindrical first intermediate shaft 21c coupled to a circle centered on the center axis of the small gear 21b. The central axes of the second clutch element 41 and the small gear 21b coincide with each other. In the disc portion 42 of the second clutch element 41, teeth portions 43 are formed at a plurality of positions in the circumferential direction of the surface facing the intermediate clutch element 34.

The teeth portions 43 have such a shape that the hole portion 37 of the intermediate clutch element 34 can be fitted thereto. For example, when the hole portion 37 is a circular hole, the teeth portions 43 have a columnar shape substantially matching the hole portion 37. The plurality of teeth portions 43 are disposed at equal intervals in the circumferential direction of the disc portion 42 of the second clutch element 41. The teeth portions 36 and the hole portions 37 of the intermediate clutch element 34, the hole portions 40 of the first clutch element 38, and the teeth portions 43 of the second clutch element 41 correspond to fitting portions, respectively. The first clutch element 38 and the second clutch element 41 are supported to be rotatable in the clutch case, but are axially immovable with respect to the clutch case.

The movable shaft 34a of the intermediate clutch element 34 is moved in the axial direction by an actuator (not illustrated). The actuator is configured to include an electric linear actuator or a hydraulic path and a mechanism for switching the path, and is controlled by the control device 48 (FIG. 1). In some cases, the actuator may be driven by the control device 48, and the disc portion 35 of the intermediate clutch element 34 may be moved to the first clutch element 38 side in the axial direction by the actuator. In this case, the intermediate clutch element 34 is connected to the first clutch element 38 by synchronous fitting between the plurality of teeth portions 36 of the intermediate clutch element 34 and the plurality of hole portions 40 of the first clutch element 38. Thus, since the drive shaft 15 (FIG. 1) of the first MG 14 is connected to the second gear mechanism 22 (FIG. 1), it is possible to perform EV traveling in which traveling is performed using both the first MG 14 and the second MG 16 as drive sources of the vehicle.

On the other hand, in some cases, the actuator may be driven by the control device 48, and the disc portion 35 of the intermediate clutch element 34 may move to the second clutch element 41 side in the axial direction by the actuator. In this case, the intermediate clutch element 34 is connected to the second clutch element 41 by synchronous fitting between the plurality of hole portions 37 of the intermediate clutch element 34 and the plurality of teeth portions 43 of the second clutch element 41. Thus, since the drive shaft 15 (FIG. 1) of the first MG 14 is connected to the first gear mechanism 20 (FIG. 1), it is possible to perform HV traveling in which the internal combustion engine 12 is connected to the first MG 14 and the second MG 16 is driven as the drive source of the vehicle.

Since the dog clutch 33 is configured as described above, the dog clutch 33 switches connection and disconnection between the drive shaft 15 of the first MG 14 and the first gear mechanism 20 or the second gear mechanism 22. Further, the hybrid vehicle 10 is configured such that the drive shaft 15 of the first MG 14 is not connected to both the vehicle drive shaft 50 and the output shaft of the internal combustion engine 12 at the same time, including at the time of normal traveling. As illustrated in FIG. 2, in some cases, the intermediate clutch element 34 may be disposed away from both the first clutch element 38 and the second clutch element 41. In this case, the drive shaft 15 of the first MG 14 is connected to neither the first gear mechanism 20 nor the second gear mechanism 22.

The control device 48 is configured to include an arithmetic processing unit, a storage unit such as a memory connected to the arithmetic processing unit, an I/O interface, and the like. The control device 48 controls the clutch mechanism 32 as described above. At the same time, the control device 48 controls the driving of the internal combustion engine 12, the first MG 14, and the second MG 16. The control device 48 switches between the EV traveling and the HV traveling on the basis of the detected value of a state of charge (SOC) which is a charging rate of the battery 18 and the detected value of the vehicle speed. The detected value of SOC is calculated, for example, on the basis of the detected value of the I/O current of the battery 18 using a current sensor (not illustrated), a detected value of a terminal voltage of the battery 18 using a voltage sensor (not illustrated), or both. The detected value of the vehicle speed is detected by the vehicle speed sensor. For example, when the detected value of the vehicle speed of the vehicle is higher than a predetermined vehicle speed value and the detected value of the SOC is higher than a predetermined SOC value, the EV traveling is executed. Otherwise, for example, when the detected value of the vehicle speed is equal to or lower than the predetermined vehicle speed value, the HV traveling is executed.

Figure 4:
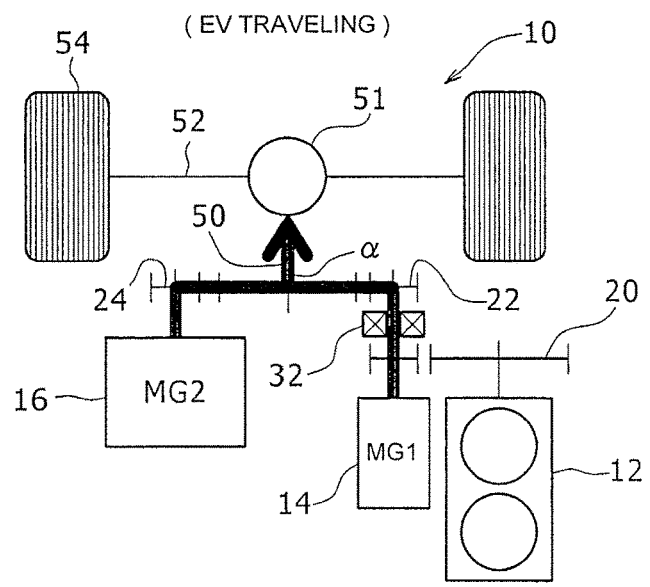
FIG. 4 is a diagram corresponding to FIG. 1 illustrating a power transmission direction in the case of performing EV traveling in the hybrid vehicle according to the embodiment of the disclosure.
Figure 5:
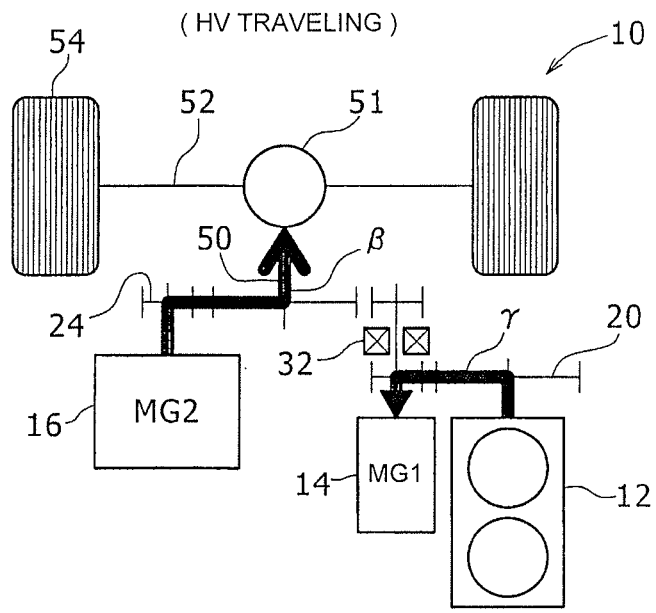
FIG. 5 is a diagram corresponding to FIG. 1 illustrating a power transmission direction in the case of performing HV traveling in the hybrid vehicle according to the embodiment of the disclosure.

FIG. 4 is a diagram corresponding to FIG. 1 illustrating a power transmission direction when the EV traveling is performed in the hybrid vehicle 10 of the embodiment. FIG. 5 is a diagram corresponding to FIG. 1 illustrating the power transmission direction when the HV traveling is performed in the hybrid vehicle 10 of the embodiment.

The control device 48 (FIG. 1) connects the first MG 14 and the vehicle drive shaft 50 with the clutch mechanism 32 when executing the EV traveling. Further, by driving the first MG 14 and the second MG 16, the control device 48 causes the vehicle to travel using both the first MG 14 and the second MG 16 as drive sources. As a result, the driving force of the first MG 14 and the second MG 16 is transmitted to the vehicle drive shaft 50 as indicated by an arrow α in FIG. 4. Therefore, since the vehicle can travel at a high vehicle speed at which the vehicle is driven with a high output, and the output of the second MG 16 does not need to be made excessively high, the second MG 16 can be miniaturized. Furthermore, since it is possible to suppress an increase in the output of the second inverter for driving the second MG 16, the cost of the vehicle can be reduced by reducing the cost of the second inverter.

On the other hand, the control device 48 connects the first MG 14 and the internal combustion engine 12 with the clutch mechanism 32 when executing the HV traveling. Further, the control device 48 drives the internal combustion engine 12 to cause the first MG 14 to generate electricity, supplies the electric power generated by the first MG 14 to the second MG 16 via the battery 18 (FIG. 1) or directly, and causes the vehicle to travel using the second MG 16 as a drive source. Thus, the driving force of the second MG 16 is transmitted to the vehicle drive shaft as indicated by an arrow β in FIG. 5, and the output of the internal combustion engine 12 is transmitted to the first MG 14 as indicated by an arrow γ in FIG. 5. As a result, the SOC of the battery 18 is suppressed from suddenly decreasing due to the electric power generated by the first MG 14.

Figure 6:
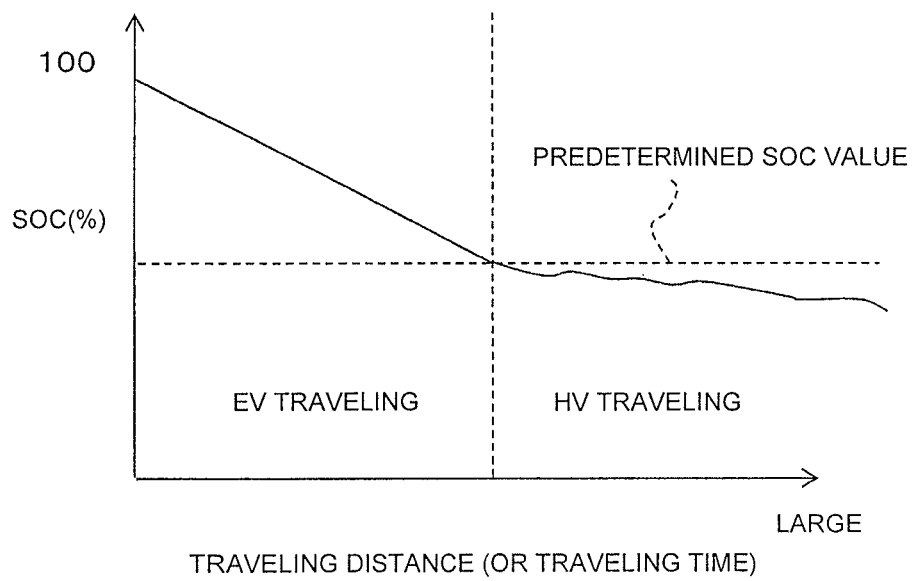
FIG. 6 is a diagram illustrating a relation between a traveling distance or a traveling time and an SOC, which is a charge rate of a battery, when the EV traveling and the HV travel are performed in the embodiment according to the disclosure.

FIG. 6 is a diagram illustrating a relation between the traveling distance or traveling time and the SOC of the battery 18 in the case of performing the EV traveling and the HV traveling in the embodiment. FIG. 6 illustrates a case in which the detected value of the vehicle speed is higher than a predetermined vehicle speed value which is one of the conditions for executing the EV traveling. When the detected value of SOC is higher than the predetermined SOC value as illustrated by the relation between the traveling distance or traveling time and the SOC illustrated in FIG. 6, the EV traveling is executed, and when the detected value of the SOC is equal to or lower than the predetermined SOC value, the HV traveling is executed. As a result, when the detected value of SOC is low, since the first MG 14 is driven by the internal combustion engine 12 to generate electricity, the SOC is prevented from suddenly decreasing. This makes it easier to protect the battery 18 and makes it easier to achieve long-distance traveling of the vehicle.

According to the above-described hybrid vehicle, the HV traveling is executed at the time of low-speed traveling when the vehicle is driven with low output. At this time, by connecting the drive shaft of the first MG 14 to the first gear mechanism 20, the internal combustion engine 12 causes the first MG 14 to generate electricity, and the generated electric power of the first MG 14 can be supplied to the second MG 16 or the battery 18. Therefore, it is possible to drive only the second MG 16, among the second MG 16 and the first MG 14, as a drive source of the vehicle, and to perform efficient vehicle traveling by setting the efficiency of the second MG 16 higher than the efficiency of the first MG 14. Therefore, the system efficiency of the vehicle can be improved by improving the power consumption rate, and the capacity of the battery 18 can be reduced. Furthermore, at the time of high-speed traveling when the vehicle is driven at high output, the EV traveling is executed. At this time, by connecting the drive shaft of the first MG 14 to the second gear mechanism 22, the driving forces of both the first MG 14 and the second MG 16 can be used as the driving force of the vehicle. As a result, the efficiency at the time of traveling can be improved, the second MG 16 can be miniaturized, the cost of the vehicle can be reduced, and the vehicle can be driven with high output such as continuous high vehicle speed traveling.

For example, a case in which 150 kW, as the maximum driving force of the vehicle, is output from the vehicle drive shaft 50 is considered. In this case, considering the case of driving the vehicle with only the second MG 16 while ignoring losses, it is necessary to output 150 kW from the second MG 16. On the other hand, considering the case of driving the vehicle with the outputs of both the second MG 16 and the first MG 14 as in the embodiment, for example, while ignoring losses, the second MG 16 outputs 110 kW, the first MG 14 outputs 40 kW, and it is possible to reduce the output power of the second MG 16.

In the above description, a case in which the control device 48 switches the EV traveling and the HV traveling on the basis of the SOC of the battery 18 and the vehicle speed of the vehicle has been described. However, a configuration in which the EV traveling and the HV traveling are switched on the basis of only the SOC, among the SOC and the vehicle speed, may be provided. For example, in a case in which the detected value of the SOC is higher than the predetermined SOC value, the EV traveling is executed when it is required to drive the vehicle at high output, and when the detected value of the SOC is equal to or lower than the predetermined SOC value, the HV traveling is performed.

Further, the control device 48 may be configured to switch between the EV traveling and the HV traveling on the basis of only the vehicle speed among the SOC and the vehicle speed. For example, when the detected value of the vehicle speed is higher than the predetermined vehicle speed value, the EV traveling is executed, and when the detected value of the vehicle speed is equal to or lower than the predetermined vehicle speed value, the HV traveling is executed. On the other hand, from the viewpoint of facilitating protection of the battery 18 and long-distance traveling of the vehicle, it is possible to switch between the EV traveling and the HV traveling on the basis of the SOC.

Figure 7:
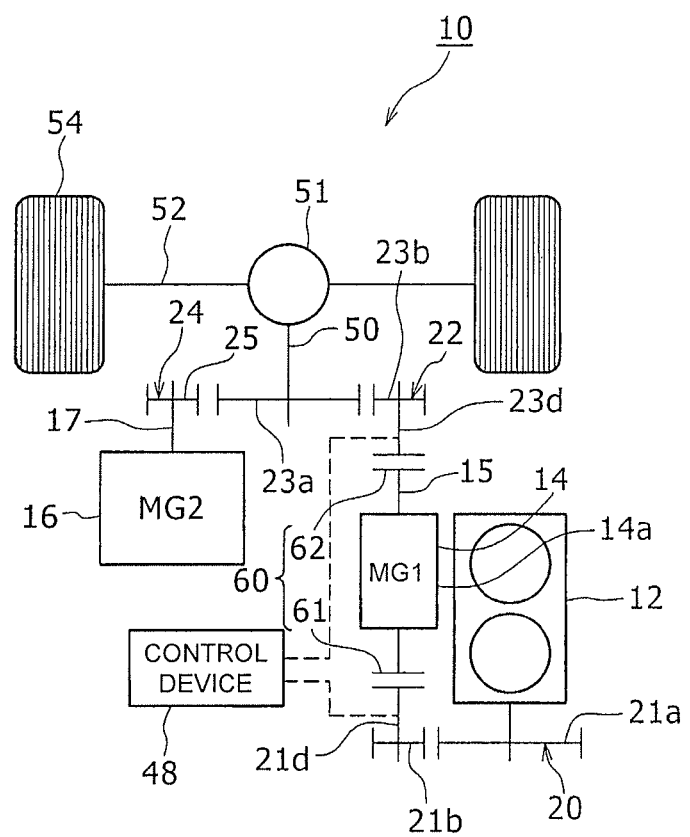
FIG. 7 is a configuration diagram of a hybrid vehicle of another example according to the embodiment of the disclosure.

FIG. 7 is a configuration diagram of a hybrid vehicle as another example of the embodiment. In the configuration of this example, the drive shaft 15 of the first MG 14 protrudes from both ends in the axial direction of the motor case 14*a*. A clutch mechanism 60 includes a first friction clutch 61 and a second friction clutch 62. The first friction clutch 61 is disposed between the first gear mechanism 20 and the other end portion (a lower end portion in FIG. 7) in the axial direction of the drive shaft 15 of the first MG 14. Specifically, the first friction clutch 61 is disposed between the other end portion in the axial direction of the drive shaft 15 of the first MG 14 and a first gear shaft 21*d* to which the small gear 21*b* of the first gear mechanism 20 is fixed. The first gear shaft 21*d* is movable in the axial direction. When the first gear shaft 21*d* approaches the first MG 14, the first friction clutch 61 is connected, and when the first gear shaft 21*d* separates from the first MG 14, the connection of the first friction clutch 61 is disconnected. The movement of the first gear shaft 21*d* in the axial direction is controlled by the control device 48 via an actuator (not illustrated). The actuator is configured to include an electric linear actuator, or a hydraulic path and a mechanism for switching the path.

On the other hand, the second friction clutch 62 is disposed between the second gear mechanism 22 and one end portion (the upper end portion in FIG. 7) in the axial direction of the drive shaft 15 of the first MG 14. Specifically, the second friction clutch 62 is disposed between one end portion in the axial direction of the drive shaft 15 of the first MG 14 and a second gear shaft 23*d* to which the small gear 23*b* of the second gear mechanism 22 is fixed. The second gear shaft 23*d* is movable in the axial direction. When the second gear shaft 23*d* approaches the first MG 14, the second friction clutch 62 is connected, and when the second gear shaft 23*d* is separated from the first MG 14, the connection of the second friction clutch 62 is disconnected. The movement of the second gear shaft 23*d* in the axial direction is controlled by the control device 48 via the above-described actuator. Thus, the clutch mechanism 60 switches the connection between the drive shaft 15 of the first MG 14 and the first gear mechanism 20 or the second gear mechanism 22 and the disconnection thereof. At the time of normal traveling, the control device 48 does not connect both the first friction clutch 61 and the second friction clutch 62 at the same time.

When executing the EV traveling, the control device 48 connects the first MG 14 and the vehicle drive shaft 50 with the second friction clutch 62. Further, by driving the first MG 14 and the second MG 16, the control device 48 causes the vehicle to travel using both the first MG 14 and the second MG 16 as drive sources.

On the other hand, when executing the HV traveling, the control device 48 connects the first MG 14 and the internal combustion engine 12 with the first friction clutch 61. Further, the control device 48 drives the internal combustion engine 12 to cause the first MG 14 to generate electricity, and supplies the electric power generated by the first MG 14 to the second MG 16 via the battery 18 or directly. At the same time, the control device 48 causes the vehicle to travel using the second MG 16 as a drive source.

Even in the case of the above-described configuration, similarly to the configurations of FIGS. 1 to 6, it is possible to improve the efficiency at the time of traveling, and it is possible to miniaturize the second MG 16, to reduce the cost of the vehicle, and to drive the vehicle at high output. Furthermore, at the time of occurrence of abnormality such as a difficulty of normal start-up of the internal combustion engine 12 by the driving of the first MG 14 due to malfunction of the first MG 14 or the like, the control device 48 can connect both the first friction clutch 61 and the second friction clutch 62. At this time, the internal combustion engine 12 can be started via the first MG 14 by driving the vehicle drive shaft 50 by a person pushing the vehicle or by pulling the vehicle by towing with another vehicle. At this time, the internal combustion engine 12 is started by pushing and rushing using the traveling inertia of the vehicle. In this example, other configurations and actions are the same as the configurations in FIG. 1 to FIG. 6.

In each of the above-described examples, a drive motor not having the function of the generator can be used instead of the second MG 16.

The invention claimed is:

1. A hybrid vehicle which travels by driving a drive motor with at least one of generated electric power of a motor generator driven by an internal combustion engine and discharged electric power of a battery, the hybrid vehicle comprising:
a first gear mechanism which transmits the power of the internal combustion engine to the motor generator side, while increasing a rotational speed of a component of the motor generator side to be higher than a rotational speed of an output shaft of the internal combustion engine between the output shaft of the internal combustion engine and a drive shaft of the motor generator;
a second gear mechanism which transmits the power of the motor generator side to a vehicle drive shaft, while decreasing a rotational speed of the vehicle drive shaft to be lower than the rotational speed of the component of the motor generator side between the drive shaft of the motor generator and the vehicle drive shaft;
a third gear mechanism which transmits the power of the drive motor side to the vehicle drive shaft, while decreasing the rotational speed of the vehicle drive shaft to be lower than a rotational speed of the component of the drive motor side between the drive motor and the vehicle drive shaft;
a clutch mechanism which switches connection and disconnection between the drive shaft of the motor generator and the first gear mechanism or the second gear mechanism; and
a control device which controls the clutch mechanism,
wherein the clutch mechanism includes a first friction clutch disposed between the first gear mechanism and the drive shaft of the motor generator, and a second friction clutch disposed between the second gear mechanism and the drive shaft of the motor generator,
wherein the drive shaft of the motor generator is configured to not be connected to both the vehicle drive shaft and the output shaft of the internal combustion engine at the same time,
wherein a first gear shaft to which a gear of the first gear mechanism is fixed is movable in an axial direction to allow switching between connection and disconnection of the first friction clutch in response to movement of the first gear shaft, and a second gear shaft to which a gear of the second gear mechanism is fixed is movable in the axial direction to allow switching between connection and disconnection of the second friction clutch in response to movement of the second gear shaft, and
wherein the control device connects both the first friction clutch and the second friction clutch when the internal combustion engine does not start normally in response to the driving of the motor generator.

2. The hybrid vehicle according to claim 1, wherein the clutch mechanism includes a dog clutch which includes an intermediate clutch element, and a first clutch element and a second clutch element disposed on both sides with the intermediate clutch element therebetween, each of the intermediate clutch element, the first clutch element, and the second clutch element has a plurality of fitting portions, and the intermediate clutch element is connected to the first clutch element or the second clutch element by synchronous fitting of the plurality of fitting portions,
the intermediate clutch element is connected to the drive shaft of the motor generator,
the first clutch element is connected to the gear constituting the second gear mechanism, and
the second clutch element is connected to the gear constituting the first gear mechanism.

3. The hybrid vehicle according to claim 2, wherein the control device performs switching between EV traveling in which traveling is performed using both the motor generator and the drive motor as drive sources of the vehicle, and HV traveling in which traveling is performed using the drive motor as the drive source of the vehicle,
when the EV traveling is executed, the motor generator and the vehicle drive shaft are connected by the clutch mechanism, and
when the HV traveling is executed, the motor generator and the internal combustion engine are connected by the clutch mechanism, the internal combustion engine is driven to generate electricity in the motor generator, and the electric power generated by the motor generator is supplied to the drive motor via the battery or directly.

4. The hybrid vehicle according to claim 1, wherein the control device performs switching between EV traveling in which traveling is performed using both the motor generator and the drive motor as drive sources of the vehicle, and HV traveling in which traveling is performed using the drive motor as the drive source of the vehicle, when the EV traveling is executed, the motor generator and the vehicle drive shaft are connected by the clutch mechanism, and when the HV traveling is executed, the motor generator and the internal combustion engine are connected by the clutch mechanism, the internal combustion engine is driven to generate electricity in the motor generator, and the electric power generated by the motor generator is supplied to the drive motor via the battery or directly.

5. The hybrid vehicle according to claim 1, wherein the control device performs switching between EV traveling in which traveling is performed using both the motor generator and the drive motor as drive sources of the vehicle, and HV traveling in which traveling is performed using the drive motor as the drive source of the vehicle, when the EV traveling is executed, the motor generator and the vehicle drive shaft are connected by the clutch mechanism, and when the HV traveling is executed, the motor generator and the internal combustion engine are connected by the clutch mechanism, the internal combustion engine is driven to generate electricity in the motor generator, and the electric power generated by the motor generator is supplied to the drive motor via the battery or directly.

* * * * *